UNITED STATES PATENT OFFICE 2,462,678

CATALYSTS FOR POLYMERIZING OLEFINS

Milton J. Roedel, Talleyville, Del., assignor to E. I. du Pont de Nemours & Company, Wilmington, Del., a corporation of Delaware No Drawing. Application August 9, 1944,
Serial No. 548,797

7 Claims. (Cl. 260—94)

This invention relates to improvements in the catalytic polymerization of ethylene and other monoolefinic compounds.

It is known that ethylene can be polymerized with the aid of catalysts such as oxygen, dialkyl dioxides, acyl peroxides, chloramine T, manganese dioxide, amine oxides, tetraphenyltin, tetraethyllead, butyllithium, and hexachloroethane.

This invention has as an object a new and improved method for polymerizing organic compounds containing monoolefinic unsaturation. Another object is to provide a new process for polymerizing monoolefinic hydrocarbons alone and in admixture with other organic compounds containing monoolefinic unsaturation. Still another object is to provide a new process for polymerizing ethylene alone and in admixture with other polymerizable organic compounds containing monoolefinic unsaturation. Further objects reside in the provision of a class of catalysts for the polymerization of ethylene alone and in admixture with other organic compounds containing monoolefinic unsaturation to produce polymers having the valuable industrial properties hereinafter described. Other objects will appear as the description proceeds.

The above objects are accomplished by conducting the polymerization at elevated temperature in contact with an oxime as a catalyst.

The term "oxime" as used herein and in the claims refers to compounds containing the group >C=NOH. Some members of this class are often described as isonitroso compounds, but there is no difference in structure or reaction between isonitroso compounds and oximes. The oximes are divided into two classes, namely, the aldoximes and the ketoximes, according to whether the structure is RCH=NOH or RR'C=NOH, wherein R and R' are monovalent organic radicals and preferably monovalent hydrocarbon radicals. Specific examples of such compounds are benzilmonoxime, benzildioxime, alpha- and beta-benzaldoxime, phloroglucinol trioxime, methyl isopropyl ketoxime, dibenzilketoxime, para-methoxyacetophenone oxime, alpha-hydrindone oxime, benzophenone oxime, methyl-beta-naphthyl ketoxime, parabenzoquinone dioxime, desoxybenzoin oxime, pinacolone oxime, mesityl oxide oxime, cyclopentanone oxime, cyclohexanone oxime, acetophenone oxime, 1-menthone oxime, isophorone oxime, carbacryl methyl ketoxime, methyl-n-nonyl ketoxime, d-carvone oxime, lauraldoxime, para-homo-salicylaldoxime, beta-naphthaldoxime, vanillin oxime, 2,4-dihydroxybenzaldoxime, trimethyl acetaldoxime, valeraldoxime, n-capro- aldoxime, beta-ethyl-beta-methylacroleinoxime, hexahydrobenzaldoxime, n-caprylaldoxime, pelargonaldoxime, 5-methylfuraldoxime, phenylacetaldoxime, meta-tolualdoxime, hydrocinnamaldoxime, benzyl methyl ketoxime, methyl-n-undecyl ketoxime, acetoxime, formaldoxime, glyoxime, methylethyl glyoxime, methyl ethyl ketoxime, butane dioxime-2,3-carboxylic acid, beta(alpha-furyl)acroleinoxime, pentadecyl aldoxime, tridecyl aldoxime, palmitaldoxime, margaraldoxime, piperonaldoxime, stearaldoxime, veratraldoxime and the like.

The organic compounds containing monoolefinic unsaturation used in the practice of this invention are those compounds of this kind which are known to be polymerizable and in which the sole carbon to carbon unsaturation is the group >C=C<. Examples of these polymerizable monoolefinic compounds are ethylene, propylene, the butylenes, tetrafluoroethylene, vinyl fluoride, vinylidene fluoride, vinyl chloride, vinyl acetate, vinyl propionate, vinyl benzoate, vinyl isobutyrate, vinyl thiolacetate, vinyl dimethylacetate and vinyl trimethylacetate, vinyl laurate, vinyl hexenoate and other organic vinyl esters, vinylidene chloride, vinyl ketones, e. g., methyl vinyl ketone, ethyl isopropenyl ketone, etc., styrene, acrylic and methacrylic acids and their esters, nitriles, amides and anhydrides, etc., N-vinyl amides, e. g., N-vinyl phthalimide, N-vinylsuccinimide, etc.

In the practice of this invention as a batch operation, a suitable reaction vessel is charged with a non-polymerizable organic liquid medium and the desired oxime as a catalyst. The vessel is closed, placed in a heated shaker machine, and connected to a source of organic compound containing monoolefinic unsaturation. Controlling and recording thermocouples are inserted and the desired organic compound containing monoolefinic unsaturation is added to the reaction vessel. Heating and agitation are then started. Upon reaching reaction temperature or after a short period of induction, the reaction starts and is normally followed by a pressure decrease due to utilization of the organic compound containing monoolefinic unsaturation. The pressure within the system is maintained throughout the reaction period either by addition of fresh organic compound containing monoolefinic unsaturation or by decreasing the free space in the reaction by increasing the volume of the medium. When the reaction is complete, as evidenced by cessation of absorption of organic compound containing monoolefinic unsaturation, the vessel is cooled, bled of excess gas, opened, and the reaction mixture discharged. The polymer is isolated from the reaction mixture by means well known to the art, e. g., by filtering and drying. The polymer is usually in a satisfactory form, but it may be purified by washing on a mill, by solvent extraction, by means of steam distillation, drying, etc. When the products are liquid hydrocarbons, they may be purified by steam distillation, fractional distillation, treatment with decolorizing agents, etc., if desired.

A modification of the above process includes polymerization of the organic compounds containing monoolefinic unsaturation, e. g., ethylene, with another polymerizable organic compound containing monoolefinic unsaturation, e. g., propylene or isobutylene. The organic compound to be polymerized with the ethylene can be added with the catalyst, or, if it is a gas at normal temperatures and pressures, it may be expanded from pressure storage tanks into the closed reaction vessel prior to or after pressuring with ethylene, or it may be added in admixture with the ethylene.

The proportion of organic compound containing monolefinic unsaturation charged into the reaction vessel can be varied over a wide range. Control of this variable can be had either by varying the pressure in the reaction vessel, by varying the ratio of the liquid charge to the free space in the reactor, by varying the reaction temperature or by a combination of these.

As a rule the amount of catalyst will range from about 0.001% to about 5% of the total weight of monomers charged into the reaction vessel. It is preferred, however, to use as small an amount of catalyst as possible as this has an effect on the molecular weight of the product obtained. As a rule the catalyst concentration will range from about 0.1% to about 2% of the total monomer charged into the reactor.

The practice of this invention is illustrated by the following examples in which parts are by weight unless otherwise specified.

Example 1

A silver-lined high-pressure reaction vessel is swept with oxygen-free nitrogen and charged with 88 parts of benzene and 0.5 part of acetone oxime, care being taken to exclude atmospheric oxygen during the loading operation. After removal of nitrogen by evacuation, the reactor is charged with ethylene to a pressure of 225 atmospheres. The temperature of the reactor is then raised to 175° C. and the pressure adjusted to approximately 950 atmospheres. During a reaction period of 14 hours the temperature is held at the indicated place and the pressure at 850 to 990 atmospheres, while the contents of the reactor are constantly mixed by agitation. A total pressure drop of 280 atmospheres is observed during the polymerization period. This total pressure drop is estimated from a number of small decreases in pressure taking place as the polymerization proceeds. In all cases, these pressure drops are compensated by repressuring with ethylene to between 900 and 990 atmospheres. When the polymerization is complete, the reactor is cooled to room temperature and the excess gas is bled off. On opening the reactor, it is found to contain 29 parts of an ethylene polymer having a tensile strength of 2340 lbs./sq. in., an elongation at break of 470%, a modulus of $0.018 \times 10^{+6}$ lbs./sq. in., a tear resistance of 139 (cellophane=9) and an intrinsic viscosity of 1.05 (measured as a 0.125% solution in xylene at 85° C.), which corresponds to a molecular weight of about 18,900.

Example 2

A stainless steel pressure reactor is flushed with oxygen-free nitrogen and is charged with 78.1 parts of tertiary butyl alcohol and 0.1 part of acetone oxime. This charge occupies about 25% of the volume of the reactor. After removal of the nitrogen by evacuation to constant pressure, the reactor is charged with ethylene to a pressure of 100 atmospheres and heated to 175° C. Upon reaching this temperature the ethylene pressure is raised to 950 atmospheres and the polymerization is allowed to proceed with agitation for 18 hours. As the ethylene polymerizes, the system is kept between 800 and 950 atmospheres pressure by periodically repressuring with ethylene. When the polymerization is completed, the reactor is cooled and the excess ethylene bled off. There is obtained 88 parts of a white solid polymer having an intrinsic viscosity of 0.64 (measured as a 0.125% solution in xylene at 85° C.). This polymer possesses a tensile strength of 1300 lbs./sq. in. at 430% elongation, contains only inappreciable quantities of grain, and is soluble to the extent of at least 30% by weight in xylene at 100° C. It is very extrudable, possessing an extrusion rate of 54.2 g./10 min./190° C./50 lbs. nitrogen pressure/$\frac{1}{16}$" orifice.

Example 3

A stainless steel pressure reactor is flushed with oxygen-free nitrogen and is charged with 352 parts of anhydrous benzene and 1 part of acetone oxime. This charge occupies about 25% of the volume of the reactor. After removal of the nitrogen by evacuation to constant pressure, the reactor is charged with ethylene to a pressure of 50 atmospheres and heated to 200° C. Upon reaching this temperature the ethylene pressure is raised to 350 atmospheres and the polymerization is allowed to proceed with agitation of the vessel for a 7-hour period. As the ethylene polymerizes, the system is kept between 280 and 350 atmospheres ethylene pressure by periodically repressuring with ethylene. After reaction is complete, the reactor is cooled and the excess ethylene is bled off. There is obtained a very fine dispersion of ethylene polymer in benzene, said dispersion containing 15.7% solids by weight. The dispersion can be filtered through felt and yields continuous films on air drying. Furthermore, when the polymer is isolated by precipitation with acetone it can be redissolved in benzene by heating the solution to its boiling point and on cooling the polymer redisperses in the benzene. The solid polymer is wax-like, melting to a free-flowing liquid at 89° C. and is well suited for hot-dip or melt-spray applications for moisture proof, protective coatings on wood, metal, paper, cloth, etc. The polymer can also be applied to said articles by calendering, as an aqueous dispersion, or as a component of a wax polish composition.

Example 4

A stainless steel high-pressure reactor is swept with oxygen-free nitrogen and then charged with 88 parts of benzene and 0.5 part of alpha-benzoin oxime, care being taken to exclude atmospheric oxygen during the loading operation.

This charge occupies about 25% of the volume of the reactor. After removal of the nitrogen used in sweeping the vessel initially, the reactor is charged with ethylene to 200 atmospheres. The temperature of the reactor is then raised to 200° C. and the pressure adjusted between 800 and 950 atmospheres. During a reaction period of 14 hours the temperature is held at 200° C. and the pressure at the indicated range. A total pressure drop of 95 atmospheres is observed during the polymerization period. This total pressure drop is estimated from a number of small decreases in pressure which take place as the polymerization proceeds. In all cases these pressure drops are compensated by repressuring with ethylene to between 850 and 950 atmospheres. When the polymerization is complete, the reactor is cooled to room temperature and excess gas is bled off. On opening the reactor it is found to contain 12 parts of a solid polymer of ethylene having a tensile strength of 960 lbs./sq. in. and a modulus of $0.022 \times 10^{+6}$ lbs./sq. in.

Example 5

A stainless steel high-pressure reaction vessel is swept with oxygen-free nitrogen and is charged with 88 parts of benzene and 0.3 part of d-camphor oxime, care being taken to exclude atmospheric oxygen during the loading operation. After removal of the nitrogen by evacuation the reactor is charged with ethylene to a pressure of 300 atmospheres. The temperature of the reactor is then raised to 150° C. and the ethylene pressure adjusted to between 850 and 950 atmospheres. During a reaction period of 16 hours the temperature is held at 150° C. and the ethylene pressure between 850 and 950 atmospheres. A total pressure drop of 355 atmospheres is observed during the polymerization period. This total pressure drop is estimated from a number of small decreases which takes place as the polymerization proceeds. These pressure drops are compensated by repressuring with ethylene to 850–950 atmospheres. When polymerization is complete, the reactor is cooled to room temperature and excess gas is bled off. On opening the reactor it is found to contain 40 parts of an ethylene polymer in sponge form of apparently low density, having a tensile strength of 3430 lbs./sq. in., an elongation at break of 450%, a bending modulus of $0.025 \times 10^{+6}$ lbs./sq. in., a tear resistance of 89, and an intrinsic viscosity of 1.07 (measured as a 0.125% solution in xylene at 85° C.). The polymer is soluble in xylene to the extent of over 20% at 100° C. The sponge form in which this tough polymer is obtained makes it eminently suited for such use as heat and sound insulation, as buoyant material for life preservers, as padding for cushions and blankets, and similar uses. In addition, this polymer is well suited for such applications as solvent cast films and fibers, extruded tubing, protective coatings and like uses.

Example 6

A stainless steel high-pressure reaction vessel is swept with oxygen-free nitrogen and charged with 88 parts of benzene and 0.5 part of cyclohexanone oxime, care being taken to exclude atmospheric oxygen during the loading operation. After removal of the nitrogen by evacuation, the reactor is charged with ethylene to 200 atmospheres pressure. The temperature of the reactor is raised to 175° C. and the pressure adjusted to between 850 and 985 atmospheres. During a reaction period of 15.5 hours the temperature is held at 175° C. and the pressure at 850 to 985 atmospheres while the contents of the reactor are constantly mixed by agitation. A total pressure drop of 620 atmospheres is observed during the polymerization period. This total pressure drop is estimated from a number of small decreases which take place as polymerization proceeds. These pressure drops are compensated by repressuring with ethylene to between 850 and 985 atmospheres. When the polymerization is complete, the reactor is cooled to room temperature and the excess gas is bled off. On opening the reactor it is found to contain 45 parts of a tough, sponge-like, apparently low density polymer having a tensile strength of 2740 lbs./sq. in., an elongation at break of 500%, a bending modulus of $0.019 \times 10^{+6}$ lbs./sq. in. and a tear resistance of 118.

Example 7

A stainless steel-lined high-pressure reaction vessel is swept with oxygen-free nitrogen and is charged with 88 parts of benzene and 0.5 part of alpha benzildioxime, care being taken to exclude atmospheric oxygen during the loading operation. After removal of the nitrogen by evacuation, the reactor is charged with ethylene to a pressure of 200 atmospheres and the temperature raised to 200° C. The pressure is then adjusted to between 850 and 950 atmospheres with ethylene. During a reaction period of 16 hours, the temperature is held at 200° C. and the ethylene pressure at 800 to 950 atmospheres while the contents are constantly mixed by agitation. A total pressure drop of 185 atmospheres is observed during the polymerization. This total pressure drop is estimated from a number of small decreases in pressure which take place as the polymerization proceeds. These pressure drops are compensated by repressuring with ethylene. When the polymerization is complete, the reactor is cooled, and excess gas is bled off. On opening the reactor, it is found to contain 16 parts of a friable polymer having an intrinsic viscosity of 0.57 (measured at a 0.125% solution in xylene at 85° C.), a tensile strength of 2,110 lbs./sq. in., an elongation as break of 590%, a bending modulus of $0.015 \times 10^{+6}$ lbs./sq. in., a tear resistance of 49, and an extrusion rate of 22.4 g./10/min./190° C./50 lbs. nitrogen pressure/$\frac{1}{16}$ inch orifice. The polymer is soluble to the extent of over 20% in xylene at 100° C. and is free of grainy particles.

Example 8

A stainless steel-lined high-pressure reaction vessel is swept with oxygen-free nitrogen and is charged with 88 parts of benzene and 0.5 part of n-butyraldoxime, care being taken to exclude atmospheric oxygen during the loading operation period. After removal of the nitrogen by evacuation, the reactor is charged with ethylene to a pressure of 200 atmospheres and the temperature raised to 200° C. The pressure within the reactor is adjusted with ethylene to between 765 and 950 atmospheres, where it is held for 17 hours. When the polymerization is complete, the reactor is cooled to room temperature and excess gas is bled off. On opening the reactor there is found 62 parts of polymer having an intrinsic viscosity of 0.72 (measured at a 0.125% solution in xylene at 85° C.), a tensile strength of 1600 lbs./sq. in. an elongation at break of 400%, a bending modulus of $0.014 \times 10^{+6}$ lbs./sq. in., a tear resistance of 41, and an extrusion rate of 19 g./10 min./190° C./25 lbs. nitrogen pressure/$\frac{1}{16}$ inch orifice. The polymer is soluble in excess of 40% in xylene at 100° C. and is free from grainy particles.

Example 9

A stainless steel-lined high-pressure vessel is swept with oxygen-free nitrogen and charged with 88 parts of benzene and 0.3 part of n-butyraldoxime, care being taken to exclude atmospheric oxygen during the charging operation. After removal of the nitrogen by evacuation, the reactor is charged with ethylene to a pressure of 100 atmospheres and the temperature raised to 225° C. The ethylene pressure at this temperature is adjusted to 900 atmospheres, whereupon the temperature spontaneously rises to 240° C. During this reaction period of ½ hour, there is an observed total pressure drop of 420 atmospheres. When the polymerization is complete, the reactor is cooled to room temperature and excess gas is bled off. On opening the reactor it is found to contain 50 parts of a low melting ethylene polymer having an intrinsic viscosity of 0.50 (measured at a 0.125% solution in xylene at 85° C.), a tensile strength of 800 lbs./sq. in., an elongation of 100% at break, a bending modulus of $0.010 \times 10^{+6}$ lbs./sq. in., and a tear resistance of 16. This polymer is soluble to the extent of at least 50% in xylene at 100° C.

Example 10

A silver-lined high-pressure shaker tube is charged with 200 parts of tertiary butyl alcohol, 0.5 part of acetone oxime and 60 parts of tetrafluoroethylene. The tube is sealed and heated, with shaking, at 150° C. for 5 hours. After cooling the tube to room temperature, it is opened, the contents discharged and steam distilled. The non-volatile residue is filtered and dried at 98° C. for 15 hours in the presence of air. There are obtained 36 parts of polymer. The polymeric tetrafluoroethylene formed is a high-melting wax.

While the examples illustrate the use of oximes in the polymerization of ethylene and tetrafluoroethylene, any other organic monoolefinic unsaturated compounds can be similarly polymerized.

In some instances it may be desirable to replace the organic medium by water or to use a mixture of water and an organic solvent. Suitable organic mediums which can be used in place of benzene include isooctane, toluene, alcohols, such as tertiary butyl alcohol, ethers, etc.

Bulk polymerization in the absence of an inert medium may also be employed. It is preferable to use reagents as pure as is commercially feasible. In general, the process is operated under conditions such that the molecular oxygen content of the system is less than 1000 parts per million, 200 parts per million being preferred, with under 20 parts per million giving attractive products.

The present invention provides a class of catalysts for the polymerization of ethylene which can be used in small quantities and offer no serious purification problems. They are effective over a wide range of temperatures and pressures, and are effective in the presence of a variety of materials.

The oxime catalysts used in the present process are operable at temperatures which may be as low as 60° C. and as high as 400° C. It is generally preferred to operate at temperatures in the range of 100° to 250° C. and pressures in excess of atmospheric. In general, pressures in excess of 4 atmospheres can be used and usually in the range of 200–3000 atmospheres.

As a rule, the use of higher pressures permits the use of lower temperatures. The particular conditions of temperature and pressure in any one case are determined not only by the particular oxime catalyst used, but also by the material being polymerized. Temperature and pressure are interdependent variables and the conditions for optimum results in any one instance have to be determined experimentally.

The present oxime catalysts do not have long induction periods, are rapid and enduring in their activity and the limit of their effectiveness is reached only when the free space in the reactor is completely occupied with products so that no more monomer or monomers can be introduced. In view of this fact it is usually advantageous to employ these catalysts in a continuous polymerization system from which the products are removed continuously. Such a continuous process may be exemplified by the passage of the whole polymerization mixture through a reaction zone maintained under appropriate polymerizing conditions or by-passing the reactants separately through a mixing chamber then through a reaction zone or by pumping the reactants separately through a reaction zone and introducing the catalyst in solution or suspension immediately prior to entering the reaction zone. In a continuous process, the catalyst solution or suspension can be introduced at intermediate stages throughout the reaction zone, since by this means the heat developed in any one portion of the apparatus is relatively small and consequently the polymerization can be carried through to a desired high molecular weight product. The present process is exothermic in character and, as in any process where the amount of heat to be removed is large, a continuous process permits greater precision in control and consequently more uniformly excellent results.

The catalysts of this invention are operable in the absence of agitation, but in many instances good agitation is conducive to good yields of polymer.

The products produced in accordance with this invention are useful for hot-dip and melt-spray applications, for conversion to wrapping foils, films, electrical and thermal insulating materials, filaments, protective coatings, and for many other purposes well known to the art.

The term "polymer" is used herein in a generic sense to refer to the products obtained by polymerizing one or more organic compounds containing olefinic unsaturation.

I claim:

1. In a process for the polymerization of ethylene, the step which comprises carrying on the polymerization in the presence of from 0.001 to 5% of an oxime under a pressure between 200 and 3000 atmospheres.

2. In a process for the polymerization of ethylene, the step which comprises carrying on the polymerization in the presence of from 0.001 to 5% of a ketoxime under a pressure between 200 and 3000 atmospheres.

3. In a process for the polymerization of ethylene, the step which comprises carrying on the polymerization in the presence of from 0.001 to 5% of ketoxime under a pressure between 200 and 3000 atmospheres.

4. In a process involving the polymerization of ethylene at a temperature between 60° and 400° C. and a pressure between 200 and 3000 atmospheres, the step which comprises conducting the polymerization in the presence of from about 0.001 to 5% of acetone oxime based on the total weight of monomers charged into the reactor.

5. A process for the preparation of extrudable polymers of ethylene which comprises polymerizing ethylene at a temperature between 100 and 250° C. at a pressure between 200 and 3000 atmospheres, in the presence of acetone oxime and a non-polymerizable inert organic liquid medium.

6. In a process for the polymerization of a monoolefin containing not more than 4 carbon atoms the step which comprises carrying out the polymerization of the monoolefin containing not more than 4 carbon atoms in the presence of from 0.001 to 5% of an oxime under pressures between 4 and 3000 atmospheres.

7. In a process for the polymerization of a monoolefin containing not more than 4 carbon atoms at a temperature between 60 and 400° C. and under a pressure between 4 and 3000 atmospheres, the step which comprises conducting the reaction with an oxime as the catalyst.

MILTON J. ROEDEL.

REFERENCES CITED

The following references are of record in the file of this patent:

UNITED STATES PATENTS

| Number | Name | Date |
| --- | --- | --- |
| 2,146,735 | Hale | Feb. 14, 1939 |
| 2,352,516 | Bruson | June 27, 1944 |
| 2,393,321 | Haworth | Jan. 22, 1946 |

OTHER REFERENCES

Schindler Monatshefte fur Chemie vol. 12, pages 410–418 (1891).